US009389331B2

(12) United States Patent
Constable et al.

(10) Patent No.: US 9,389,331 B2
(45) Date of Patent: Jul. 12, 2016

(54) LONG BASELINE NAVIGATION SYSTEM (75) Inventors: Steven C. Constable, San Diego, CA (US); Kerry W. Key, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 713 days.

(21) Appl. No.: 13/564,670

(22) Filed: Aug. 1, 2012

(65) Prior Publication Data
US 2012/0291556 A1 Nov. 22, 2012

Related U.S. Application Data (63) Continuation of application No. 12/377,594, filed as application No. PCT/US2007/077306 on Aug. 30, 2007, now Pat. No. 8,253,418.

(60) Provisional application No. 60/824,051, filed on Aug. 30, 2006.

(51) Int. Cl.
*G01V 1/28* (2006.01)
*G01V 3/12* (2006.01)
*G01V 1/38* (2006.01)
*G01V 3/08* (2006.01)

(52) U.S. Cl.
CPC ............... *G01V 3/12* (2013.01); *G01V 1/3835* (2013.01); *G01V 3/083* (2013.01)

(58) Field of Classification Search
USPC .......................................................... 367/19
See application file for complete search history.

(56) References Cited

U.S. PATENT DOCUMENTS

| 2,293,024 | A | * | 8/1942 | Klipsch | 324/364 |
| 2,531,088 | A | * | 11/1950 | Thompson | 324/365 |
| 2,839,721 | A | * | 6/1958 | De Witte | 324/365 |
| 2,872,638 | A | * | 2/1959 | Jones | 324/365 |
| 3,052,836 | A | * | 9/1962 | Postma | 324/365 |
| 3,182,250 | A | * | 5/1965 | Mayes | 324/365 |
| 4,047,098 | A | | 9/1977 | Duroux | |

(Continued)

FOREIGN PATENT DOCUMENTS

GB 2402222 A 2/2005
GB 2423370 A 8/2006

OTHER PUBLICATIONS

International Search Report and Written Opinion issued on Apr. 2, 2008 in PCT/US2007/077306, 6 pages.

(Continued)

*Primary Examiner* — James Hulka
(74) *Attorney, Agent, or Firm* — Greer, Burns & Crain, Ltd.; Eleanor M. Musick (57) ABSTRACT

An acoustic navigation system includes a vessel and an interrogation unit towed behind the vessel below the surface of the water, a tail acoustic transponder trailing behind the interrogation unit, and a pair of surface acoustic transponders towed behind the vessel on the surface of the body of water. The interrogation unit generates an acoustic interrogation signal and receives responses from each of the tail acoustic transponder and the surface acoustic transponders from which it triangulates its position. The surface acoustic transponders may further include GPS receivers for receiving positioning information from GPS satellites. Additional acoustic transponders on instruments located on the floor of the body of water respond to the interrogation signal to allow triangulation of the location of the instruments.

20 Claims, 10 Drawing Sheets (56) References Cited

U.S. PATENT DOCUMENTS

| | | | |
|---|---|---|---|
| 4,110,726 A | | 8/1978 | Dorrance et al. |
| 4,187,492 A | * | 2/1980 | Delignieres .................. 367/127 |
| 4,298,840 A | | 11/1981 | Bischoff et al. |
| 4,617,518 A | | 10/1986 | Srnka |
| 4,633,182 A | | 12/1986 | Dzwinel |
| 4,912,682 A | * | 3/1990 | Norton et al. .................. 367/19 |
| 4,992,990 A | * | 2/1991 | Langeland et al. ............. 367/19 |
| 5,480,000 A | | 1/1996 | Daido et al. |
| 5,668,775 A | * | 9/1997 | Hatteland ...................... 367/19 |
| 5,764,061 A | | 6/1998 | Asakawa et al. |
| 5,770,945 A | | 6/1998 | Constable |
| 6,236,212 B1 | | 5/2001 | Wynn |
| 6,480,000 B1 | * | 11/2002 | Kong et al. .................. 324/338 |
| 6,603,313 B1 | | 8/2003 | Srnka |
| 7,109,717 B2 | | 9/2006 | Constable |
| 7,116,108 B2 | | 10/2006 | Constable |
| 7,126,338 B2 | * | 10/2006 | MacGregor et al. .......... 324/334 |
| 7,376,045 B2 | * | 5/2008 | Falkenberg et al. ............ 367/19 |
| 7,483,792 B2 | * | 1/2009 | MacGregor et al. ............. 702/2 |
| 7,679,367 B2 | * | 3/2010 | MacGregor et al. .......... 324/348 |
| 8,253,418 B2 | | 8/2012 | Constable et al. |
| 8,378,671 B1 | * | 2/2013 | Mahoney ..................... 324/248 |
| 8,378,685 B2 | * | 2/2013 | Morrison et al. ............. 324/344 |
| 2001/0032928 A1 | | 10/2001 | Boone |
| 2003/0043692 A1 | | 3/2003 | Ellingsrud et al. |
| 2003/0048105 A1 | | 3/2003 | Ellingsrud et al. |
| 2003/0052685 A1 | | 3/2003 | Ellingsrud et al. |
| 2004/0000912 A1 | | 1/2004 | Conti et al. |
| 2004/0119478 A1 | | 6/2004 | Allen et al. |
| 2005/0077902 A1 | * | 4/2005 | MacGregor et al. .......... 324/334 |
| 2005/0134278 A1 | | 6/2005 | Nichols |
| 2005/0264294 A1 | * | 12/2005 | Constable ..................... 324/348 |
| 2005/0276665 A1 | * | 12/2005 | Entralgo et al. .............. 405/190 |
| 2006/0133199 A1 | * | 6/2006 | Tenghamn ..................... 367/17 |
| 2006/0186889 A1 | | 8/2006 | Andreis |
| 2007/0021916 A1 | * | 1/2007 | MacGregor et al. ............ 702/13 |
| 2007/0091719 A1 | * | 4/2007 | Falkenberg et al. ............ 367/19 |
| 2007/0194919 A1 | | 8/2007 | Blanche et al. |
| 2007/0247161 A1 | | 10/2007 | Zerilli et al. |
| 2008/0105425 A1 | * | 5/2008 | MacGregor et al. ..... 166/250.01 |
| 2010/0246322 A1 | * | 9/2010 | Welker ............................ 367/15 |

OTHER PUBLICATIONS

Constable, Steven et al. Special Section—Marine Controlled-Source Electromagnetic Methods: An introduction to marine controlled-source electromagnetic methods for hydrocarbon exploration, Geophysics, Vol. 72, No. 2 (Mar.-Apr. 2007); p. WA3-WA12.

Chave, Alan D. et al. Chapter 12 Electrical Exploration Methods for the Seafloor, Electromagnetic Methods in Applied Geophysics, vol. 2, M. Nabighian (ed), Soc. Explor. Geophys., Tulsa., 1991, pp. 931-966.

US 6,522,146, 02/2003, Srnka (withdrawn)

* cited by examiner

LONG BASELINE NAVIGATION SYSTEM

RELATED APPLICATIONS

This application is a continuation of application Ser. No. 12/377,594, filed Feb. 13, 2009, which is a 371 national stage filing of International Application No. PCT/US07/77306, filed Aug. 30, 2007, which claims the benefit of the priority of U.S. provisional application No. 60/824,051, filed Aug. 30, 2006. Each of the prior applications is incorporated herein by reference in its entirety.

FIELD OF THE INVENTION

The invention relates to a method and system for detection and mapping of geologic formations such as seafloor hydrocarbon reservoirs by measuring electromagnetic fields and more particularly to measuring of the electric and/or magnetic field amplitude gradient and phase velocity on the seafloor during controlled source marine electromagnetic surveys.

BACKGROUND OF THE INVENTION

In geophysics, electric and electromagnetic (EM) methods are used to measure the electric properties of geologic formations. At low frequencies, rock resistivity accounts for almost all of the electromagnetic response. Because replacement of saline pore fluids by hydrocarbons increases the resistivity of reservoir rocks, EM methods are important exploration tools. Seismic methods had traditionally been used for detection of such geologic formations, however, the results could be ambiguous.

Several electromagnetic methods have been developed for mapping sub-seafloor resistivity variations. See, for example, U.S. Pat. No. 5,770,945 of Constable (magnetotelluric (MT) methods), U.S. Pat. No. 7,116,108 of Constable (MT and controlled electromagnetic (EM) source methods), U.S. Pat. No. 7,109,717 of Constable (controlled EM source for monitoring), U.S. Pat. No. 6,522,146 OF Srnka (controlled EM source), International Publication No. WO 03/048812 of MacGregor and Sinha (controlled EM source), and International Publication No. WO 01/57555 of Rees (controlled EM source). The disclosure of each of the identified patent documents is incorporated herein by reference.

The magnetotelluric (MT) method is an established technique that uses measurements of naturally occurring electromagnetic fields to determine the electrical resistivity, or conductivity, of subsurface rocks. An MT survey employs time series measurements of orthogonal components of the electric and magnetic fields, which define a surface impedance. This impedance, observed over a broad band of frequencies and over the surface, determines the electrical conductivity distribution beneath that surface, with horizontal layers of the earth being mathematically analogous to segments of a transmission line. Principal factors affecting the resistivity of subsurface materials include temperature, pressure, saturation with fluids, structure, texture, composition and electrochemical parameters. Resistivity information may be used to map major stratigraphic units, determine relative porosity or support a geological interpretation. A significant application of MT surveying is oil exploration. An MT survey may be performed in addition to seismic, gravity and magnetic data surveys. A combination of data from two or more different survey methods leads to a more complete understanding of subsurface structure than may be possible through the use of any single technique alone, particularly where the structure is such that measurement using a given technique may be contraindicated.

For example, certain structures such as sediments buried under salt, basalt or carbonate have poor seismic performance and productivity. These structures generate strong reflections and reverberations, making imaging of the buried sediments difficult using acoustic methods alone. On the other hand, because the MT method does not involve the measurement of responses to artificially-created seismic events, it can be utilized in lieu of, or in combination with, seismic methods to minimize the error induced by reflections.

Electric fields are well suited to applications in seawater. Transmitter currents can be passed through seawater with simple electrode systems and relatively low power consumption by way of towed transmitter antennas towed through the seawater. Controlled source electromagnetic (CSEM) methods have been shown to be useful in evaluation of reservoir resistivity for targets in very shallow water to as deep as several thousand meters, achieving seafloor penetration depths as great as 5-10 km in 5 km of water. Such methods involve deployment of a seafloor receiver with orthogonal antennae and towing an electric field transmitter near the seafloor at some distance away. The transmitter is towed close to the seafloor to maximize the coupling of electric and magnetic field with seafloor rocks. Such methods have provided significant economic savings in terms of avoiding the costs of drilling test wells into sub-seafloor structures that do not contain economically recoverable amounts of hydrocarbon. In addition, these methods could be used for positioning wells for optimal recovery based on the shape of the reservoir.

Figure 1A:
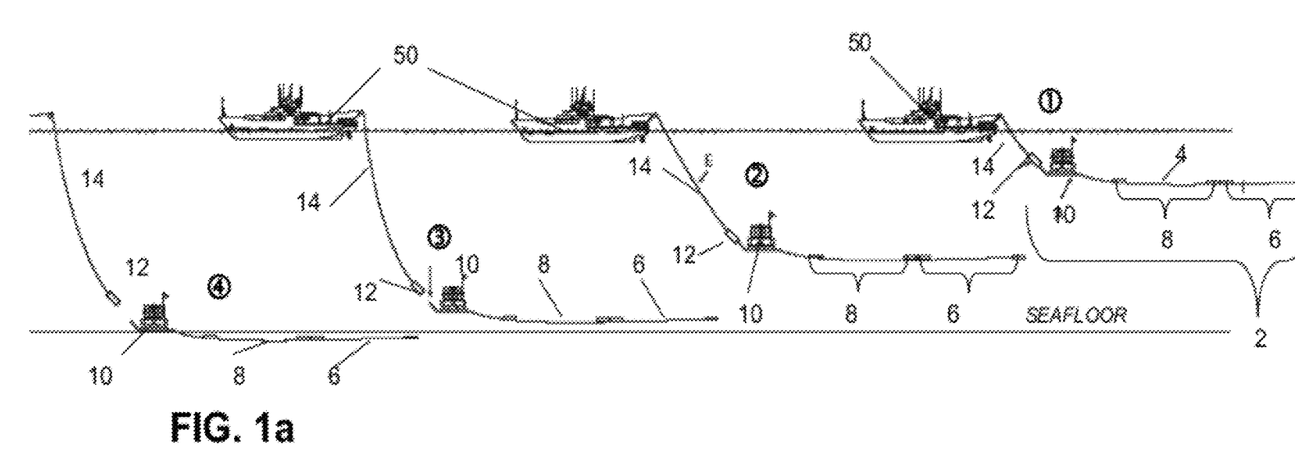
FIG. 1a is a diagrammatic view showing deployment of a LEM system according to the invention for measuring horizontal gradients.

The current technologies described above typically require antennas on the order of 10 m to make low noise measurements of seafloor electric fields. It is known that the use of a long antenna, known as a "LEM", on the seafloor (100 m long or more) provides a better signal to noise ratio for electric field measurements than existing instruments. An exemplary LEM deployment is shown in FIG. 1a. (See, e.g., A. D. Chave, et al., "Electrical Exploration Methods for the Seafloor" in *Electromagnetic Methods in Applied Geophysics*, Vol. 2, M. Nabighian (ed.), Soc. Explor. Geophys., 1991.)

Although great progress has been made by industry in the past few years, the collection of seafloor data is still a technologically sophisticated exercise, and further development of the technology is needed. Currently, the bulk of marine CSEM surveys are carried out to assess the resistivity of targets previously identified by seismic methods, often based on structure but usually including a seismic DHI (direct hydrocarbon indicator). The next frontier in the use of marine CSEM is to extend the depth capability to identify the resistivity of structural targets that are too deep to exhibit a seismic DHI. Although the physics of diffusive EM propagation will always require that the target size be significant compared to the depth of burial, currently the noise floor of the transmitter/receiver system, along with the quality of transmitter waveform stability and navigation, are limiting factors in detecting deep resistivity targets.

Accordingly, the need remains for improvements to instrumentation systems and methods to enhance signal quality and sensitivity in CSEM surveys. The present invention is directed to such improvements.

BRIEF SUMMARY OF THE INVENTION

In an exemplary embodiment, the system and method for precision measurement of the electric field amplitude gradient and phase velocity on the seafloor modifies the conventional long-wire electromagnetic (LEM) receiver by increasing the number of discrete antennae placed on a single long wire. In the exemplary implementation, two dipoles of electric field data are positioned exactly adjacent to each other, providing input to the same data logger system located within a survey unit such as that disclosed in U.S. Pat. No. 5,770,945, to which the long wire is connected. Highly precise electric field gradients can be obtained by taking the difference of the measurements of the two electrodes, both for amplitude and phase. Any common-mode source of noise, such as magnetotelluric signals, receiver instrument noise, etc. is rejected when the signals from the two electrodes are differenced.

Low noise amplifiers and other electronics for processing the signals generated by the electrodes are described in the Constable patents identified in the background of the invention. Multiple pairs of electrodes can be arranged across an area of interest to measure horizontal gradients across a target area, for example, using arrangements such as those shown in FIG. 2 of U.S. Pat. No. 7,109,717.

According to the present invention, an intelligent ranging long-line baseline acoustic transceiver is disposed on a deep-towed electromagnetic transmitter, preferably with command, control and/or communication to the ship along the deep-tow cable.

The measurement system and method according to the present invention are not limited to measurement of horizontal electric field gradients. The inventive LEM can be configured or combined with vertically oriented dipoles for measurement of the vertical electric field gradient. For example, the survey unit disclosed in U.S. Pat. No. 7,116,108, or a similar device, may be deployed at locations on the seafloor with two pairs of electrodes adjacent to each other in a serial arrangement along a line that has a float at its end. Alternatively, additional conductors may be included in the LEM wire, with a wire split off of the main wire at a position at which vertical measurement is desired. One or more pairs of electrodes are placed on the split-off wire. A float at the end of the split-off wire will cause the antenna(s) to be vertically oriented while the main wire extends horizontally. With two antennae on the vertical wire, it may be possible to determine vertical gradient if the wire is sufficiently long to reduce noise Also, two or more magnetic field detectors can be arranged in a serial relationship in a line along which the horizontal magnetic field gradient is to be measured. In general, the invention relates to the measurement of a gradient and the use of two or more sets of electromagnetic detectors arranged in a serial relationship and oriented in a direction over which the gradient is to be measured.

The apparent phase velocity (gradient of phase) is much larger over thin resistive targets such as hydrocarbon reservoirs. The horizontal gradients exhibit a larger signal at shorter source-receiver ranges than traditional controlled source electromagnetic (CSEM) surveys for a difficult hydrocarbon target.

A long-baseline acoustic navigation system for determining the positions of the instruments in the measurement system includes a vessel and an interrogation unit towed behind the vessel below the surface of the water, a tail acoustic transponder trailing behind the interrogation unit, and a pair of surface acoustic transponders towed behind the vessel on the surface of the body of water. The interrogation unit generates an acoustic interrogation signal and receives responses from each of the tail acoustic transponder and the surface acoustic transponders from which it triangulates its position. The surface acoustic transponders may further include GPS receivers for receiving positioning information from GPS satellites. Additional acoustic transponders on instruments located on the seafloor respond to the interrogation signal to allow triangulation of the location of the instruments.

BRIEF DESCRIPTION OF THE DRAWINGS

The accompanying drawings, which are incorporated in and form a part of the specification, illustrate exemplary embodiments of the present invention and, together with the description, disclose the principles of the invention, wherein:

FIGS. 4a-4d are plots of horizontal electric field amplitudes and phases from a 2D model study of a 100 m thick, 4,000 m wide, target buried at a depth of 3500 m below the seafloor, where FIG. 4a plots total field amplitude versus source-receiver range.

DESCRIPTION OF THE INVENTION

The present invention extends the capability of marine controlled source EM (CSEM) technology to permit detection of ultra-deep targets (lacking seismic direct hydrocarbon indicators, or DHI's) by improving detection thresholds. Long receiver antennas (LEM instruments) are used to determine the spatial gradient of the horizontal electric fields. An additional aspect of the invention incorporates triangulation techniques using a transmitter mounted long base line (LBL) acoustic system for more accurate source navigation.

The present invention improves detection thresholds by using long receiver antennas (LEM instruments). With the exception of the magnetotelluric signal, most of the noise sources in the seafloor CSEM receivers are voltage sources, rather than electric field noise. For this reason, improved SNR can be achieved by making the electric field sensor antenna longer. Seafloor recorders with antennae up to 1 km long can be deployed using only one ship. (See, e.g., Webb et al., 1985). These recorders are referred to as Longwire Electro-Magnetic (LEM) recorders. At least an order of magnitude improvement in signal-to-noise ratio (SNR) can be obtained with this change. Antennae up to the length of the transmitter antenna (200-300 m) would produce no loss of resolution, and a routine noise floor of around $3 \times 10^{-17}$ V/m/(Am) can be achieved this way with modest size transmitters.

Figure 1B:
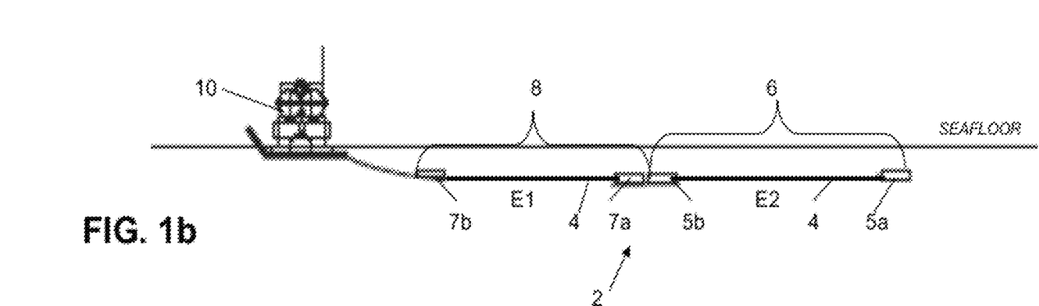
FIG. 1b is a diagrammatic view showing the modified LEM sensor according to the present invention.

As illustrated in FIG. 1b, a LEM sensor antenna 2 consists of a tail float and transponder placed on the end of a length of wire 4. (It should be noted that the terms "LEM", "LEM sensor", "LEM receiver", and LEM antenna" may be used interchangeably throughout this description, however, each term refers the same device.) The length of wire 4 should be greater than 10 m to provide improved SNR and is typically in the range of 50 to 300 m, preferably on the order of 200 m. Lengths of 1 km and longer can be used, however, deployment may be challenging. In a typical system, a 4-conductor, insulated wire may be used, however, the number of conductors will be determined by the number of electrode pairs to be used. Alternatively, if a larger number of electrode pairs is desired, multiple 4-conductor cables can be bundled to define wire 4. The wire 4 is fed out from the deployment vessel 50 using a reel, and two electrode pairs 6 and 8 are positioned adjacent to each other along the wire as it is spooled out to create two antenna of substantially equal length. The wire is electrically and physically connected to a seafloor unit 10 which includes data collection instrumentation. The same basic unit is described in U.S. Pat. No. 5,770,945, and illustrated in FIG. 5, but does not have the orthogonal dipoles (electrodes 118-121 and supporting booms 139-142) extending from the unit's body. An electro-mechanical cable (wire 14) attached to the ship's winch is connected to the seafloor unit 10 by a remotely-activatable release mechanism 12. The unit 10 is slowly lowered into the water towards the seafloor by feeding out wire 14 while maintaining the ship 50 at a constant speed, on the order of 2 knots. (Steps 1 and 2 in FIG. 1*a*.) As the LEM antenna 2 approaches the seafloor, the release mechanism 12 is activated either acoustically or by means of a signal passed down the winch cable to release the LEM antenna (Step 3), which comes to rest on the seafloor with wire 4 fully extended (Step 4). Wire 14 is recovered and may be used to release one or more LEM antennae 2 and/or additional seafloor units. In an alternate embodiment, the function of wire 4 can be split between two or more separate wires, depending on the number of electrodes, with each separate wire supporting one electrode pair. To ensure that the distal electrode of the antenna closest to the seafloor unit 10 is immediately adjacent to the proximal electrode of the farthest antenna, it may be preferable to bundle the separate wires together.

An exemplary survey operation includes 2 LEM antennae deployed in approximately the same location, with 8 additional seafloor units configured for vertical E-field measurement (as described in U.S. Pat. No. 7,116,108) arranged 200 m apart in a line with the LEM antennae. Additional seafloor units may be included for MT measurement. In an alternate embodiment, the LEM antenna can be combined with vertical field measurement ability by providing additional conductors in wire 4 that can be branched off at one or more positions along the length of the wire. Floats attached to the ends of the branched segment will cause the segment and one or more electrode pairs on the segment to be vertically oriented. The signal from the vertical branch can be collected by the same data logger.

After the desired sensors are in place, a CSEM transmitter is placed in the water and towed by the ship using the deep tow line over the positions of the LEM receiver(s) and additional seafloor units, which record the time-varying source signal. The recorded signal is converted to amplitude and phase of the transmitted signal as a function of source-receiver offset and frequency.

The inventive system and method for precision measurement of the gradient of the electric field amplitude and the phase velocity on the seafloor modifies the conventional LEM receiver to increase the number of discrete antennae measured on the long wire. In the exemplary implementation, two dipoles of electric field data are recorded exactly adjacent to each other using the same data logger system. Such an arrangement is illustrated more clearly in FIG. 1*b*, where proximal antenna 6 is formed by electrodes 5*a* and 5*b* attached to wire 4, and distal antenna 8 is formed by electrodes 7*a* and 7*b*, also attached to wire 4, which is electrically connected to the data logger retained within unit 10. Ideally, antennae 6 and 8 are of equal length, however, equal lengths are not required since compensation can be applied during processing. Electrodes 5*b* and 7*a* are located adjacent each other on wire 4. Highly precise electric field gradients can be obtained by taking the difference of the measurements of the two dipoles 6 and 8, both for amplitude and phase. Any common-mode source of noise, such as magnetotelluric signals, receiver instrument noise, etc. is rejected when signals E1 and E2 from dipoles 6 and 8 are differenced. The LEM receiver of the present invention is not limited to two discrete antennae. The number of electrode pairs can be increased, keeping in mind that longer the dipole lengths are preferred for improved SNR, which would need to be balanced against any advantages provided by multiple data points along a single line. For example, three pairs of electrodes, effectively dividing wire 4 into three equal length antennae arranged serially along the long-line, can be used, with amplitude differences and phase velocities being calculated for each of the adjacent pairs, i.e., A+B and B+C, to provide data at different positions along the line. Four electrode pairs could provide three different difference calculations, and so on.

Figure 1C:
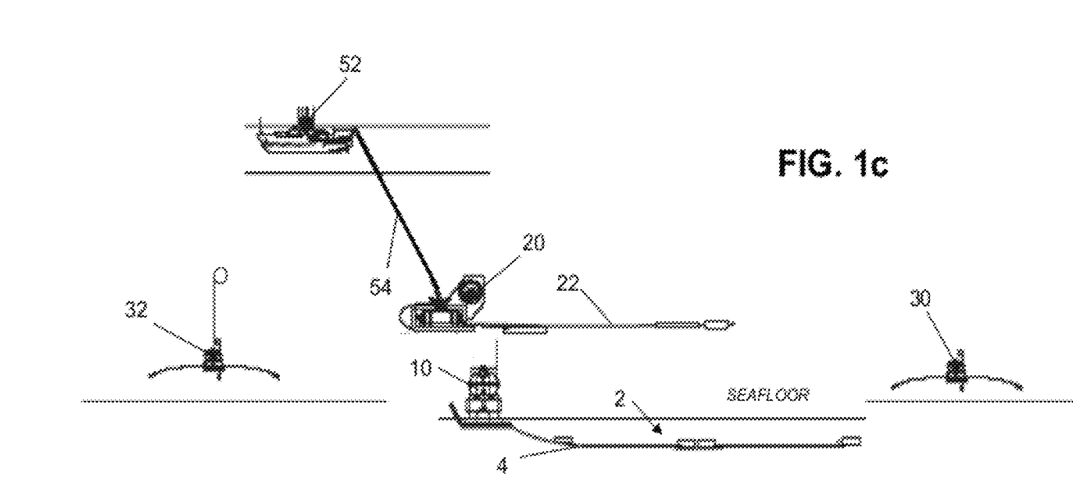
FIG. 1c is a diagrammatic view of operation of a CSEM transmitter for detection by a LEM system.

As illustrated in FIG. 1*c*, a CSEM transmitter 20 (with a dipole pair defining antenna 22) is deep-towed from a ship 52 (which may or may not be the same ship used to deploy the LEM) via deep-tow line 54 over the area of interest in which the LEM 10 receiver is deployed. As in most CSEM methods, the transmitter is towed close to the seafloor to maximize the coupling of electric and magnetic fields with seafloor rocks. Electric fields measured by dipoles 6 and 8 are converted into signals that are recorded, along with time stamps corresponding to the recorded signal on a data logger located within unit 10. (The timing record permits the electric and magnetic field signals to be related to the position of the transmitter as a particular moment in time.) The difference of the measurements is used to determine the amplitude gradient and phase velocity in the direction along with the LEM wire 4 extends. Also illustrated are separate survey units 30 that can be used to record additional electric field data, such as vertical field measurements, and/or provide magnetic field data.

The calculated spatial gradient of the horizontal electric fields measured by dipoles 6 and 8 is used to detect and characterize a hydrocarbon reservoir. When modeling the response of hydrocarbon reservoirs, the separation of the target response from the background response is a result of a larger horizontal gradient in the horizontal electric field over the target. It is believed that the horizontal gradients, and, equivalently, the horizontal apparent phase velocities, may be a more robust indicator of the target presence than field amplitudes, which can be altered by resistive material anywhere between the source and receiver (for example, resistive rocks directly beneath the transmitter). Furthermore, horizontal gradients will reject magnetotelluric noise, which has long spatial wavelengths.

Figure 2:
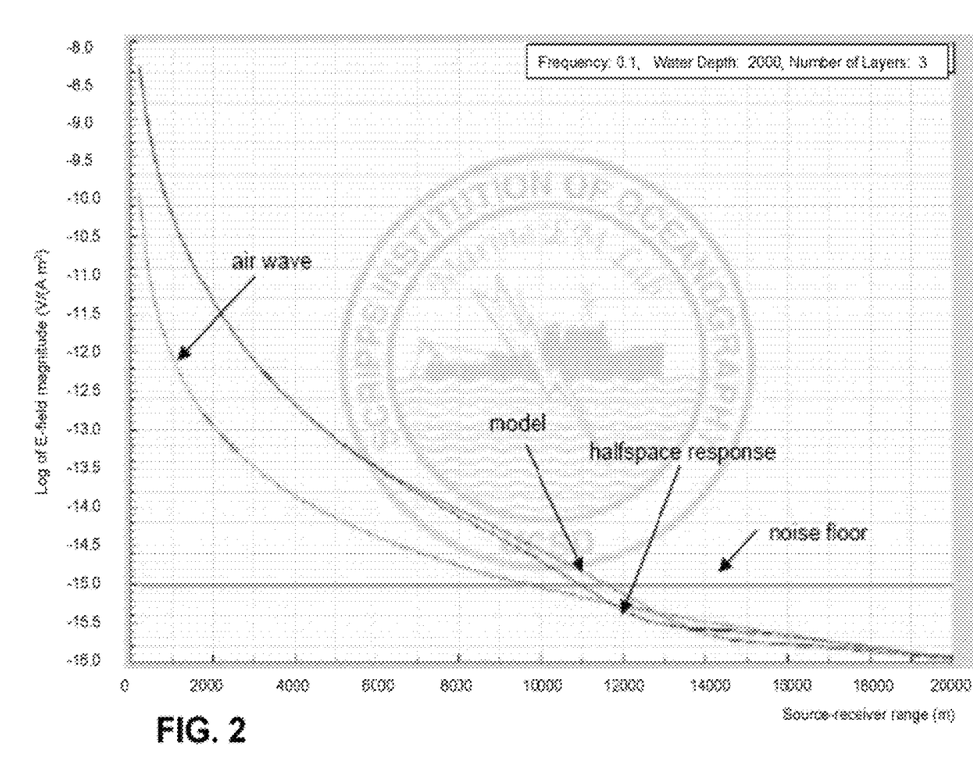
FIG. 2 is a plot of the one-dimensional response of a 4 km deep target (100 $\Omega$m×50 m thick).

FIG. 2 illustrates the 1-dimensional response of a 4 km deep target (100 $\Omega$m×50 m thick), plotted as radial mode field amplitude versus source-receiver offset. If the target was only 8 km in diameter, the difference between the target and the background responses would become a maximum of 0.1 orders of magnitude, or 26%, and the target response would assume the same falloff, or gradient, as the background. Many other heterogeneities in resistivity could produce a 26% change in amplitude, so a pair of measurements at 8 km range (on target) and, e.g., 10 km range (off target), both having a 26% 'anomaly' would be highly ambiguous. However, there will be about a factor of two difference in the gradient of the horizontal field on and off target, which may be robust to static variations in amplitude.

Model studies can be performed using the 1D analytical code of Flosadottir and Constable (1996) and the 2D finite element code of Li and Key (2006) to quantify gradient effects associated with oil field targets. For testing, two gradient field detection systems can be constructed using arrays of well navigated conventional (10 m antenna) horizontal receivers, such as the unit illustrated in FIG. 5, and LEMs equipped with two adjacent 100-200 m antennae. With the LEM gradiometer, any common mode instrumental noise sources can also be rejected, which is not the case for gradients obtained from the conventional receivers.

The utility of gradient measurements can be demonstrated using a 2D forward model study. In one test, the example was a 100 m thick, 80 Ohm-m target of lateral extent 4000 m, buried in a 1 Ohm-m background and situated 3500 m below the seafloor in 1500 m water depth. FIGS. 4a-d are a set of plots of horizontal electric field amplitudes and phases versus source-receiver range from a 2D model study of a 100 m thick, 4000 m wide target buried at a depth of 3500 m below the seafloor (mbsf). All measurements shown in FIGS. 4a-d are above the noise floor of a LEM instrument.

The resistivity contrast between the host and target is 1:80. A transmitter broadcasting at 0.1 Hz is situated at −2000 m. The background response and the (background+target) response are shown as the dashed and solid lines, respectively. The transmitter was positioned 2 km off the edge of the target (−2000 m in each of the plots). The model response is complicated because of an interaction between the target response and the air wave at receiver positions greater than 5000 m. The difference in the gradients in the horizontal fields (FIG. 4b) is about twice the difference between the raw amplitudes (FIG. 4a) (36% versus 16%), and the difference in phase over a 100 m baseline (about 10°) is roughly the same as the absolute difference in phase between the two models (host only and host plus target). The phase difference could be increased by increasing baseline length—200 m is quite feasible. However, the real advantage of gradient measurements is not only the raw size of the anomalies, but also that: (1) magnetotelluric noise and noise from large scale water motion can be effectively removed from gradient estimates; (2) in the region of target response, the gradient in the field amplitudes are largely immune from errors in the source-receiver separation (see FIG. 4b); (3) amplitude gradients are immune to limitations in receiver calibration or estimation of transmitter source dipole moment; (4) phase velocities measured on a single LEM are immune from errors in the transmitter phase or clock drift in the receiver; (5) a measurable difference (1.2° over a 100 m baseline) in the phase velocity occurs at a receiver position of 3000 m, while the absolute phase difference does not reach this threshold until a position of 5,500 m, allowing higher resolution surveys and/or the detection of smaller targets. The traditional amplitude ratio ('anomaly') at 3000 m is an immeasurably small 2%.

Figure 5:
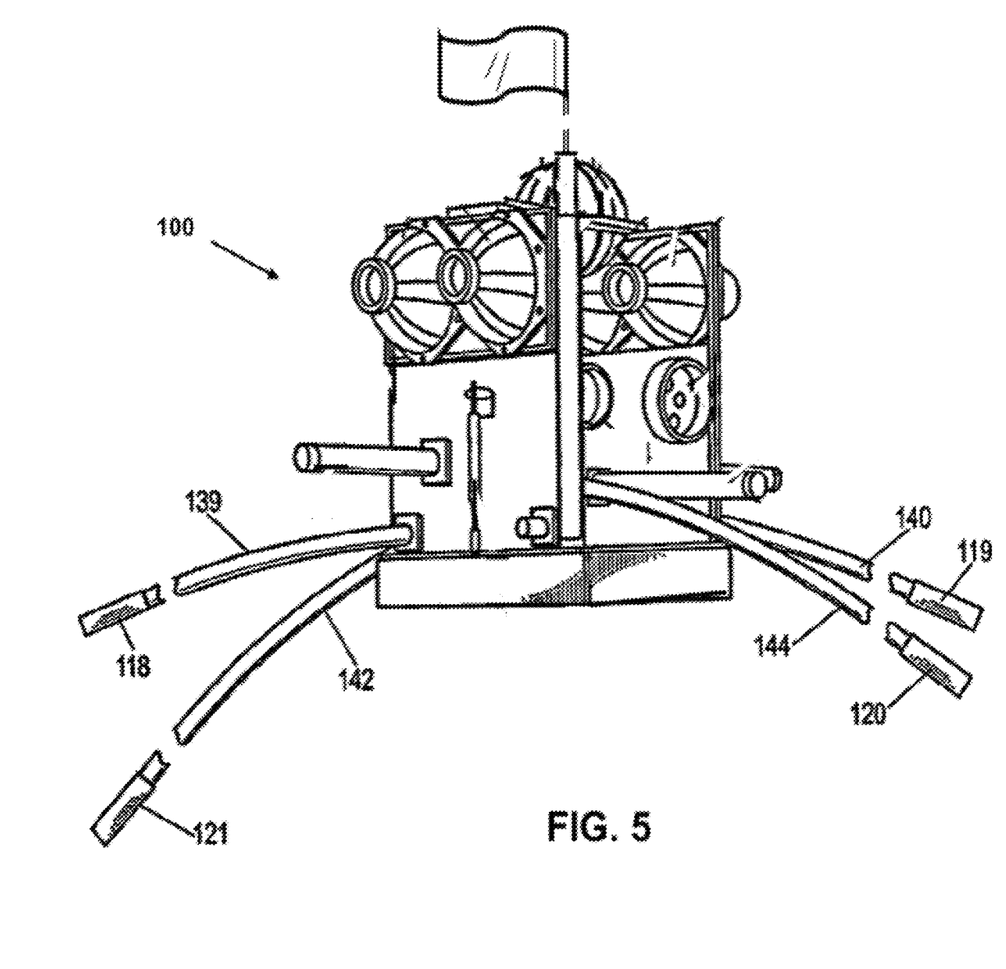
FIG. 5 is a diagrammatic perspective view of an exemplary survey unit.

U.S. Patent Publication No. 2006/0186889 of Andreis discloses an arrangement for measurement of electric field gradients using discrete receiver units, where each receiver unit is used to measure horizontal field gradients in two directions using orthogonal antennas extending from the unit, i.e., using a survey unit similar to that shown in FIG. 5 except with a centrally located electrode so that each electrode boom corresponds to a separate antenna. The gradients measured by the different antennas are then combined to provide combined response data which the inventor asserts is relatively insensitive to the transverse electric (TE) mode component of the transmitted signal, which is particularly problematic in shallow water due to the airwave component in EM fields induced by a CSEM transmitter. The combined response data is independent of direction. This differs from the present method on a number of points, including the shorter dipoles (on the order of 5 meters for antennas mounted on a receiver unit) and the lack of directionality of the measurement. (Directional control improves signal interpretation and resolution.) As previously stated, the shorter dipoles on the discrete units tend to be more susceptible to noise than do LEM antennas. Further, since each receiver unit has a separate data collection system with its own clock, the different clocks, and the difficulty in synchronizing them, make it difficult to accurately measure phase velocity across the area, preventing high resolution measurement of phase velocity.

Figure 6A:
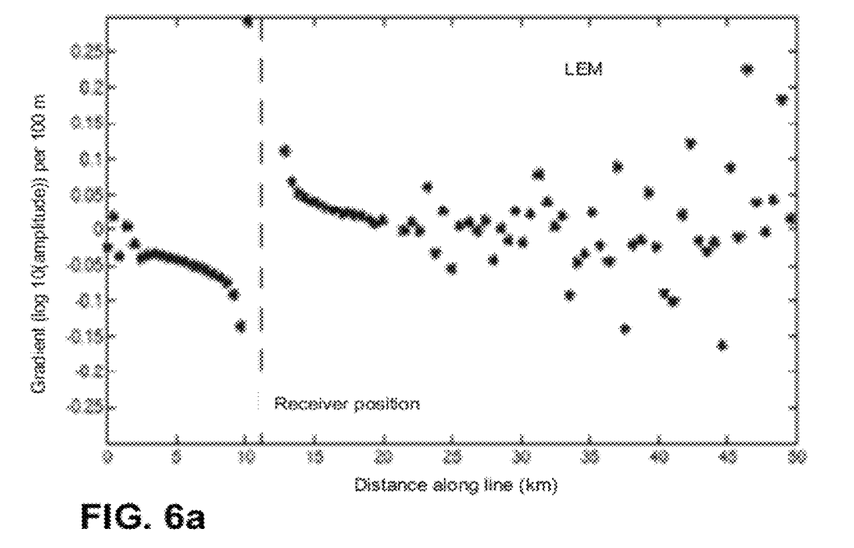
FIGS. 6a-6d are plots comparing amplitude and phase velocity measurements using the inventive LEM instrument versus conventional methods.
Figure 6B:
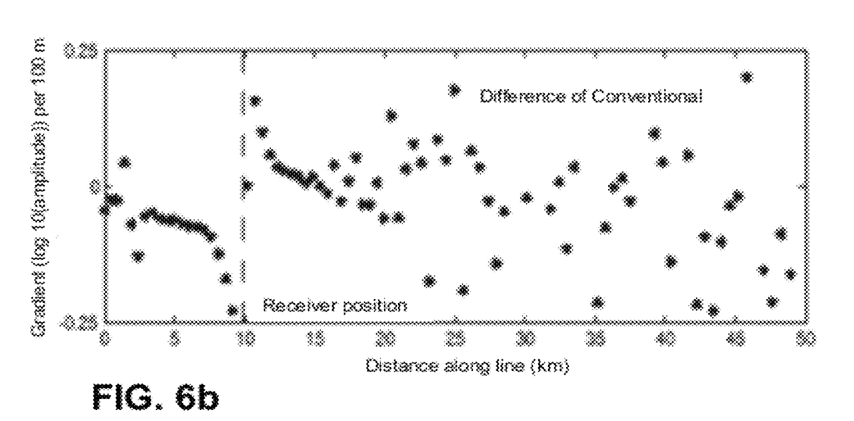
Figure 6C:
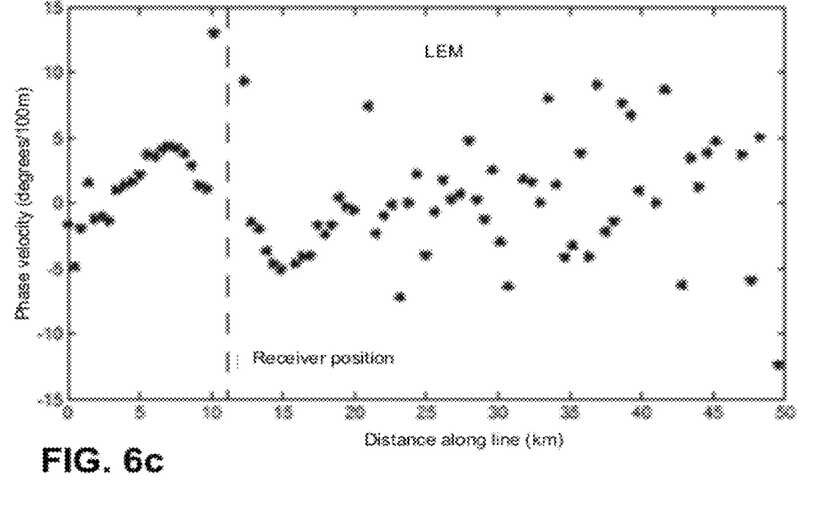
Figure 6D:
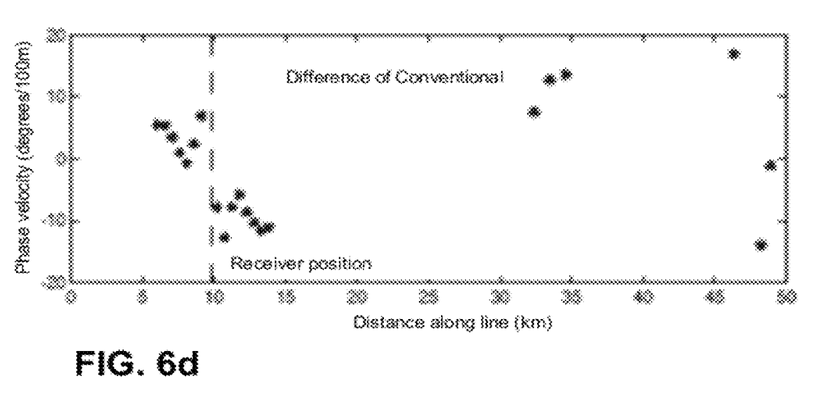

FIGS. 6a-6d provide examples of gradient data collected from a LEM sensor according to the present invention and from discrete seafloor survey units deployed at locations comparable to the LEM locations. FIGS. 6a and 6c are plots of amplitude gradients and phase velocity, respectively, measured using the LEM sensor of the present invention with a 200 meter antenna divided into two 100 m segments. As previously stated, the two antenna segments need not be of equal length, but are in this case for convenience. FIGS. 6b and 6d plot the corresponding measurements taken by conventional means by differencing two discrete seafloor survey units with 10 m antennae that were separated by 200 meters. The frequency of transmission was ⅓ Hz. The water depth was 1090 m. The transmitter had a dipole moment of 60 kAm (300 amps on a 200 meter long antenna.) As is apparent from the plots, the quality of the data is better for the LEM instrument, particularly for the phase velocities. With the inventive LEM sensor, data can be obtained out to ranges of 10 km compared with 5 km for the conventional means, thus effectively doubling the depth of investigation.

In initial testing of the inventive system, a vessel of adequate size for CSEM operations was used. Two LEM gradiometer systems based on the inventive receiver design are deployed, along with an array of conventional receivers, and a couple of moored transponders. A Scripps 500A EM transmitter (SUESI500 (Scripps Undersea EM Source Instrument)) was deployed and operated to test the transmitter system and provide signals for the inventive LEMs and conventional instruments so that gradient processing could be performed. SUESI is a horizontal electric dipole EM transmitter for CSEM exploration. Deep-towing with SUESI is accomplished using a standard 0.680 inch (17 mm) UNOLS copper coaxial cable, thus avoiding the need to outfit the tow ship with expensive fiber-optic cables and time-consuming terminations. Specifications for SUESI can be found on the Internet at the website for the Marine EM Lab (marineemlab) of Scripps Institution of Oceanography (University of California at San Diego (ucsd.edu).) In an alternate embodiment, the transmitter need not be towed, but can be deployed to an appropriate location within the area to be surveyed.

An important component of detection and measurement of hydrocarbon reservoirs under the seafloor is the ability to generate an accurate map of the site to permit return to the same location for further testing and/or extraction operations. This can be a challenge with changes in currents, weather conditions and other factors. Accordingly, another aspect of the invention is to provide a system for accurate ranging of sites during measurement.

Short base line (SBL) acoustic systems are commercially available and have the advantage that both a range and bearing from the ship can be obtained for a transmitter or receiver instrument. However, SBL accuracy decreases in deep water, and errors in transmitter and receiver positions are cumulative.

Figure 3:
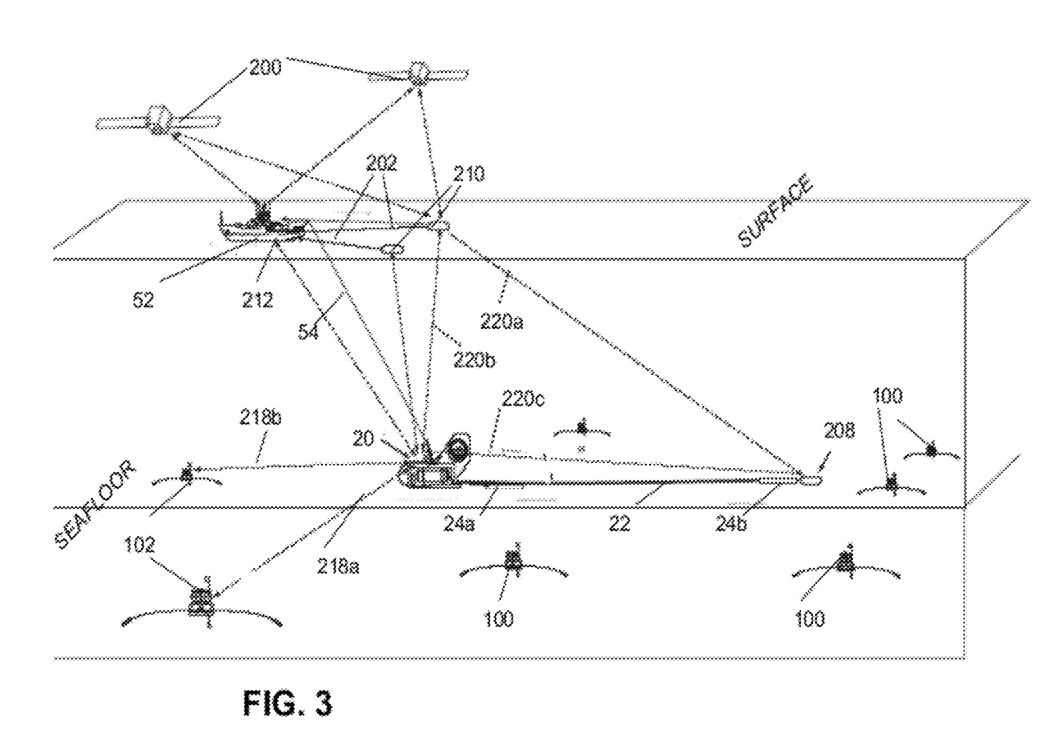
FIG. 3 is a diagram of transmitter mounted long base line (LBL) acoustic navigation system.
Figure 4A:
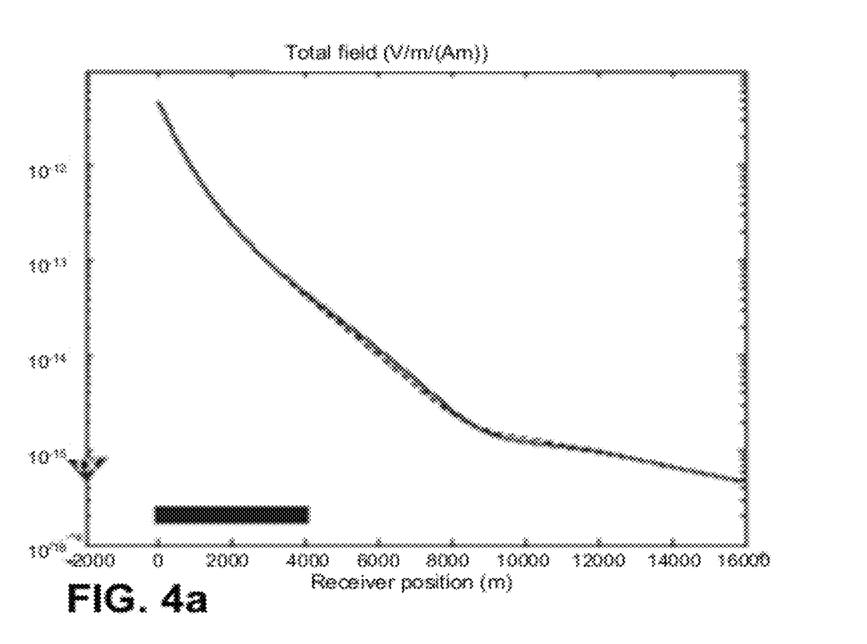
Figure 4B:
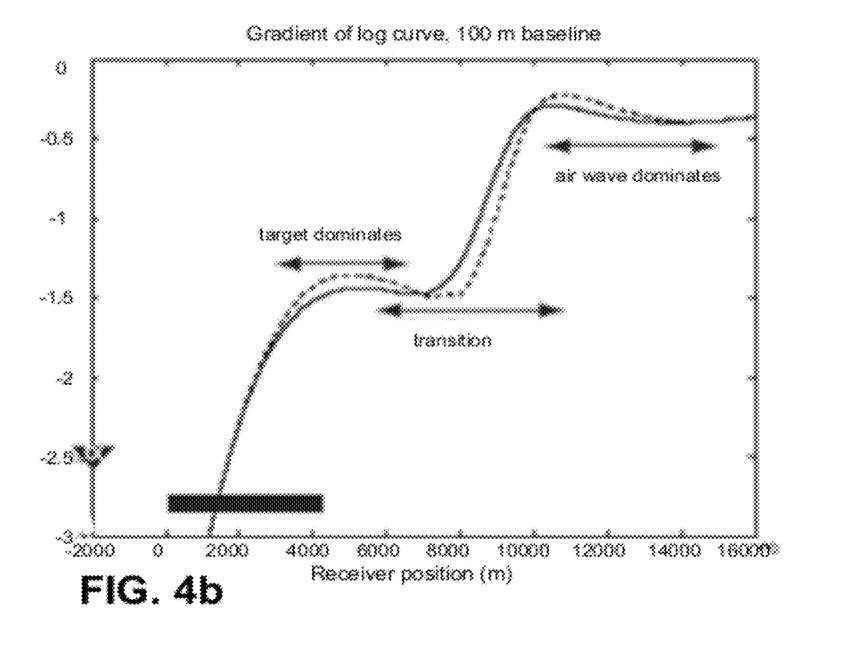
FIG. 4b is a plot of amplitude gradient with range.
Figure 4C:
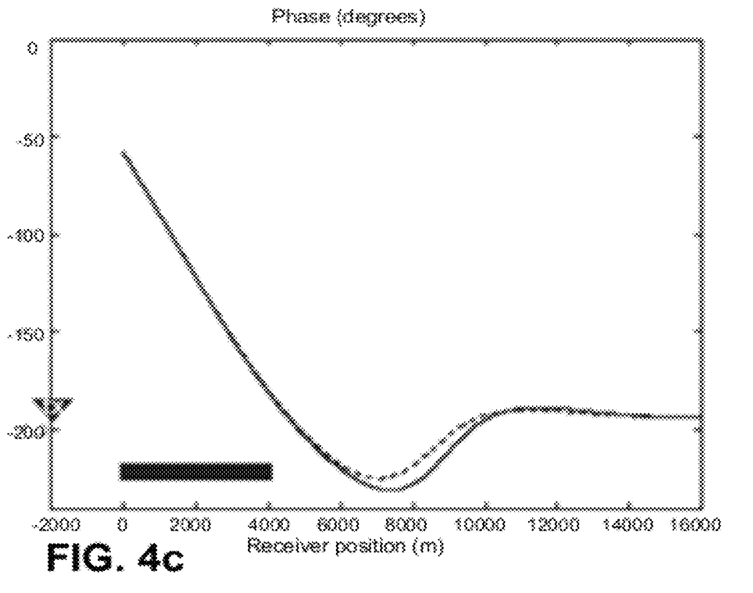
FIG. 4c is a plot of phase versus receiver position.
Figure 4D:
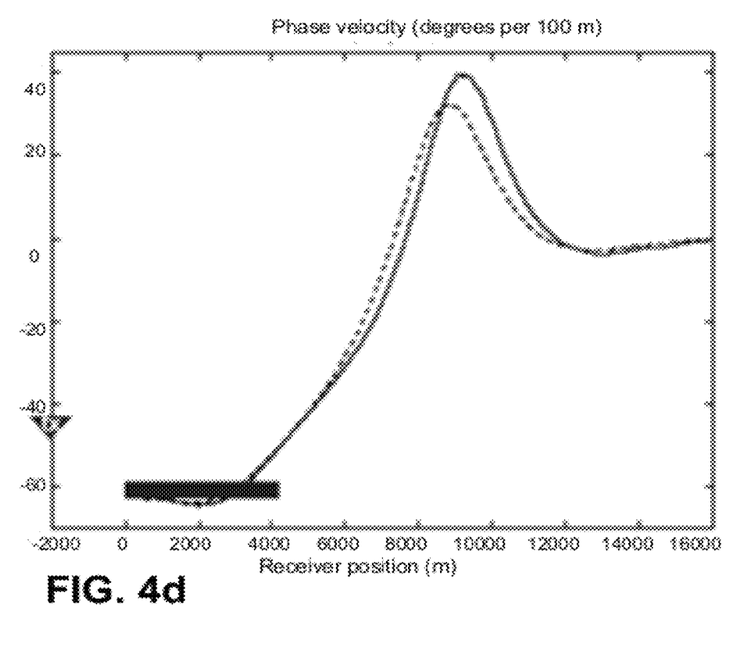
FIG. 4d is a plot of phase velocity versus receiver range.

FIG. 3 is a diagram of a transmitter-mounted long base line (LBL) acoustic navigation system that has been designed to improve the accuracy of range and bearing of the instruments. In an exemplary embodiment, an intelligent interrogation system, preferably with command/control/communication to the ship 52 along the deep-tow cable 54, is fitted into a pressure housing and mounted on the transmitter 20. Appropriate interrogation systems are commercially available including the BENTHOS® DS-7000 (Benthos, Inc., North Falmouth, Mass.), the EDGETECH® Model PS8010 (Edgeone LLC, Milford, Mass.), and the O.R.E. Model 8011M Acoustic Transceiver (Ferranti O.R.E. Inc., Falmouth, Mass.). It should be noted that these systems are not sold with pressure housings, but must be put into such a housing for use on the deep-tow EM transmitter.

The interrogation unit on deep-tow transmitter 20 obtains direct ranges on receiver instruments and communicates the results up tow cable 54 along with the other transmitter parameters to a data logger on ship 52. A relay transponder 208 on the far end of antenna 22 (with electrodes 24a & 24b) allows the full transmitter geometry to be obtained in real time (with the exception of the tail altitude or depth, which will need to be logged by a separate tail unit, which is known in the art). Interrogation by the intelligent transponder of the transmitter 20 gives direct transmitter-receiver ranges, allowing direct ranging to acoustic transponders on the seafloor instruments. In FIG. 3, seafloor units 102 are fitted with acoustic transponders, which are indicated by the dotted lines 218a and 218b to be communicating with the transceiver in the EM transmitter 20. (For confirmation of the improvements provided by the inventive method, the seafloor instruments were previously surveyed using standard long baseline (LBL) acoustics.) According to the inventive method, if the deep-tow EM transmitter 20 also has an altimeter to give height above the seafloor and a depth gauge to measure depth (which is a standard practice in the field), the position of the deep-tow transmitter 20 can be triangulated.

Seafloor EM receivers (units 100, 102) listen at various frequencies between 8.5 kHz and 15.5 kHz, and all reply at 12.0 kHz. Relay transponder 208 on the tail end of the antenna 22, near or on electrode 24b, listens to the 12 kHz replies and generates a dedicated 8 kHz response, thus providing the tail-receiver range as well. If the seafloor location of the receivers limits the distance of reliable interrogation, a small number of moored navigation transponders can be deployed.

Relay transponder 208 also enables determination of the distance around the three sides of the triangle (indicated by dotted lines 220a, b & c) whenever the LBL unit ranges on a surface or seafloor transponder. The length of the antenna 22 is known (or the LBL unit can range directly on the relay transponder 208), giving enough information to determine the range between the relay transponder 208 and the surface transponder 210 or seafloor transponder 102. This allows both ends of the antenna 22 to be navigated in three dimensions. Accuracy is improved by adding a recording depth gauge to the relay transponder 208.

Further improvement in source navigation is provided by towing a pair of transponders 210 on the surface behind the ship 52. Standard vanes are used to keep the two transponders separated by several hundred (>300) meters or more. Ideally, the separation should be about half the water depth at the survey site. The surface transponders 210 also have GPS receivers for positioning relative to GPS satellites 200, and radio telemetry to transmit their positions back to the ship 52. As illustrated, transponders 210 are attached to the back of ship 52 by communication cables 202. Alternatively, communication cables 202 can be attached onto the tow cable, however, this is not as easy as simply trailing them behind the ship. The radio telemetry gives improved triangulation, and it is easier to range to the surface than to the seafloor instruments. An additional surface transponder 212 can be provided on the vessel since the vessel's position is also known using GPS. Alternatively, or in addition, measurement of the towing cable length 54 can be used to monitor the separation between the vessel 52 and the EM transmitter 20 to provide the deep-tow distance.

Figure 7:
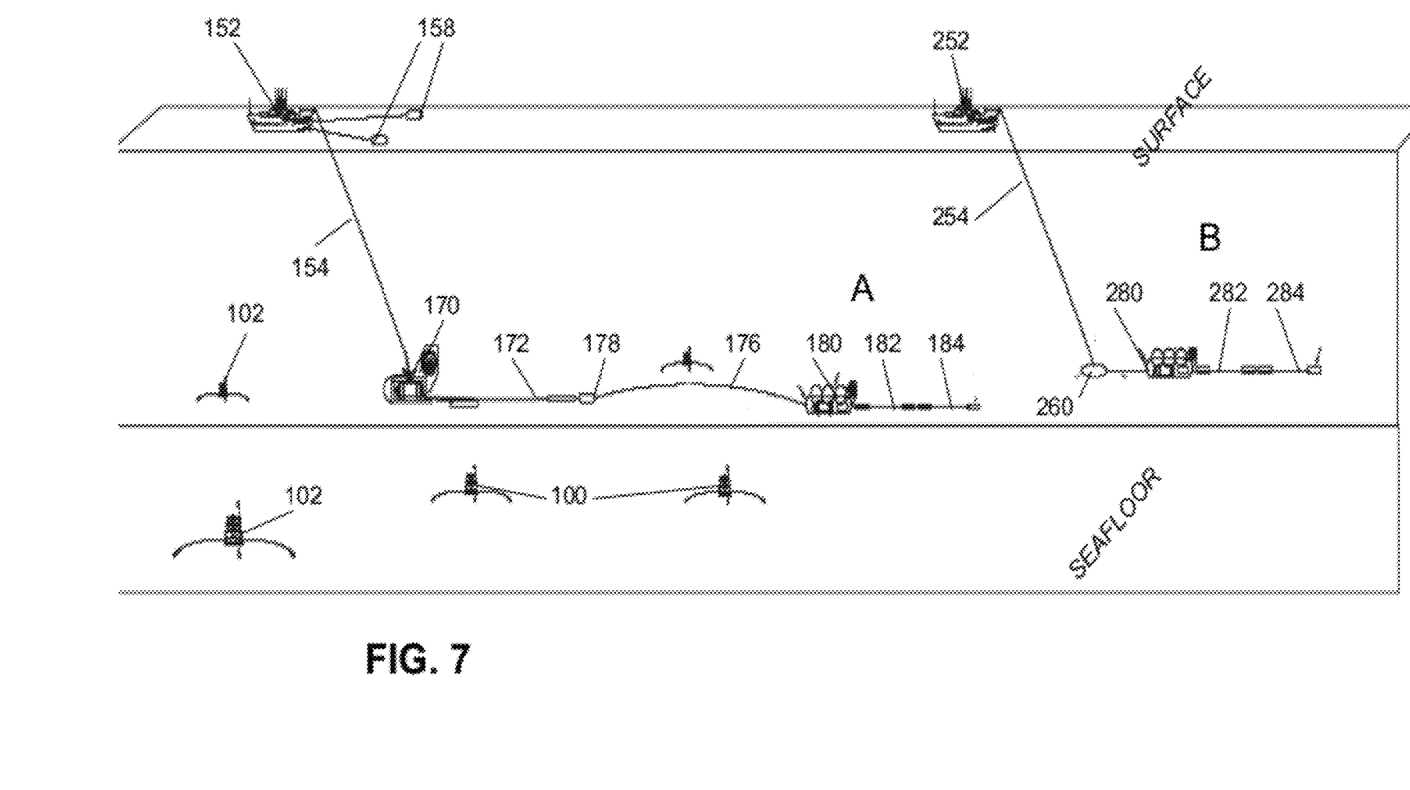
FIG. 7 is a diagram of alternative methods for deployment of the LEM of the present invention.

In an alternate embodiment, instead of being deployed on the seafloor, the LEM gradient instruments can be towed on a long floating rope behind a transmitter (A) or by another vessel (B), both of which are illustrated in FIG. 7. In case (A), ship 152 deep-tows EM transmitter 170 via deep-tow cable 154. Antenna 172 trails behind and communicates with EM transmitter, with relay transponder 178 provided for ranging of the tail of the transmitter antenna 172 relative to surface transponders 158 and/or seafloor receivers 100, 102, in the same manner as described above. Attached to relay transponder 178 is a floating tether 176 that is, in turn, connected to EM receiver 180. EM receiver 180 houses data collection and communication electronics, in a similar manner as seafloor unit 10 in FIGS. 1a-1c, as well as supporting another relay transponder and depth gauge for range and depth recording for the receiver. An altimeter can also be included for measuring height above seabed. EM receiver 180 is neutrally buoyant to allow it to remain at generally the same altitude as the transmitter 170. Trailing behind EM receiver 180 is the inventive LEM antenna described above, with two discrete antennae 182 and 184 positioned serially on a single cable.

In case (B) of FIG. 7, which can be used alternatively or in conjunction with the configuration of case (A) a separate vessel 252 deep-tows EM receiver 280, which is neutrally buoyant, with two discrete antennae 282 and 284 positioned adjacent each other on a single cable trailing behind receiver 280. A depressor weight 260 is located at the end of deep-tow cable 254 and connected to receiver 280 by a soft tether to maintain the receiver and antenna at the desired depth. Variations on or combinations of case (A) and case (B) may also be used with appropriate source-receiver range information.

Using the inventive devices and methods described herein, phase stability, source/receiver positioning, and receiver performance are significantly improved compared to conventional methods. The devices and methods of the present invention are useful for any petroleum exploration, seafloor characterization, or geotechnical application that requires an image of sub-seafloor electrical conductivity. In particular, the inventive devices and methods may be able to detect and image hydrocarbon reservoirs that are too deep or too small to be imaged using conventional CSEM technology.

The following references are incorporated herein by reference:

Flosadottir, A. H. and S. Constable, 1996. Marine controlled source electromagnetic sounding 1. Modeling and experimental design. *J. Geophys. Res.,* 101, 5507-5517.

Li, Y., and K. Key, 2006. 2D marine controlled-source electromagnetic modeling: Part 1—An adaptive finite element algorithm, *Geophysics,* 72(2), WA51-WA62, 2007.

Webb, S. C., Constable, S. C., Cox, C. S., and Deaton, T. K., 1985. A seafloor electric field instrument. *Geomag. Geoelectr.,* 37, 1115-1129.

Weiss, C. J., and S. Constable, 2006. Mapping Thin Resistors in the Marine Environment, Part II: Modeling and Analysis in 3D. *Geophysics*, Vol. 71:2, pp. G43-G51 (March April 2006).

The invention claimed is:

1. A long baseline navigation system, the system comprising:
   a vessel;
   a deep-tow transmitter/interrogation unit configured for towing near a floor of a body of water, the transmitter/interrogation unit comprises an electromagnetic transmitter configured for emitting an electromagnetic signal for coupling with structures on the floor of the body of water to generate electric field gradients detectable by a plurality of antennae disposed on the floor of the body of water, and an acoustic transmitter/receiving configured to generate an acoustic interrogation signal and to receive responses thereto;
   a deep-tow cable attached to the vessel for towing the transmitter/interrogation unit;
   at least one tail acoustic transponder trailing behind the transmitter/interrogation unit, the at least one tail acoustic transponder adapted for receiving the acoustic interrogation signal and generating a tail response; and
   a pair of surface acoustic transponders towed by the vessel on the surface of the body of water, wherein the surface acoustic transponders of the pair are separated from each other by a pre-determined separation, and wherein the surface acoustic transponders each receive the acoustic interrogation signal and generate a surface response;
   wherein the transmitter/interrogation unit receives the tail response and the two surface responses and triangulates its position therefrom.

2. The system of claim 1, wherein the tow cable further comprises communication cables for communicating data between the vessel and the transmitter/interrogation unit.

3. The system of claim 1, wherein each surface acoustic transponder further comprises a GPS receiver for receiving positioning information from GPS satellites.

4. The system of claim 1, wherein the tail transponder and the transmitter/interrogation unit are separated by a known distance.

5. The system of claim 1, further comprising a vessel acoustic transponder for receiving the acoustic interrogation signal and generate a vessel response.

6. The system of claim 1, wherein the tail transponder listens for the acoustic interrogation signal at a first frequency and generates a tail response at a second frequency.

7. The system of claim 1, wherein each of the plurality of antennae comprises a floor transponder configured to listen for the acoustic interrogation signal and generates a floor response.

8. The system of claim 7, wherein the floor transponders listen at frequencies within a pre-determined range and generate floor responses at a single specified frequency.

9. The system of claim 1, wherein the surface acoustic transponders comprise vanes adapted to maintain the pre-determined separation.

10. The system of claim 1, wherein the pre-determined separation is several hundred meters.

11. The system of claim 1, wherein each of the surface acoustic transponders further comprises radio telemetry for transmitting their positions to the vessel.

12. The system of claim 1, wherein the transmitter/interrogation unit further comprises a depth gauge.

13. The system of claim 1, wherein the transmitter/interrogation unit further comprises an altimeter.

14. A method for determining a position of one or more underwater instruments, the method comprising:
   deep-towing a transmitter/interrogation unit behind a vessel, the transmitter/interrogation unit comprising an electromagnetic transmitter configured for emitting an electromagnetic signal for coupling with structures on the floor of the body of water to generate electric field gradients detectable by a plurality of antennae disposed on the floor of the body of water, and an acoustic transmitter/receiving configured for emitting an acoustic interrogation signal;
   trailing a tail acoustic transponder behind the transmitter/interrogation unit, the tail acoustic transponder adapted for receiving the acoustic interrogation signal and generating a tail response;
   towing a pair of surface acoustic transponders behind the vessel on the surface of the body of water, wherein the pair of surface acoustic transponders are separated from each other at a pre-determined separation, and wherein the surface acoustic transponders each receive the acoustic interrogation signal and generate a surface response; and
   emitting the acoustic interrogation signal;
   receiving the tail response and the surface responses; and
   triangulating the position of the transmitter/interrogation unit.

15. The method of claim 14, further comprising receiving positioning information from GPS satellites at each surface acoustic transponder.

16. The method of claim 14, further comprising:
   disposing a vessel acoustic transponder on the vessel;
   receiving the acoustic interrogation signal at the vessel acoustic transponder; and
   generating a vessel response to the acoustic interrogation signal.

17. The method of claim 14, wherein the tail transponder listens for the acoustic interrogation signal at a first frequency and generates a tail response at a second frequency.

18. The method of claim 14, further comprising:
   positioning floor transponders in association with each of the plurality of antennae;
   listening at each floor transponder for the acoustic interrogation signal;
   generating a floor response; and
   calculating within the transmitter/interrogation unit the location of each floor transponder.

19. The method of claim 18, wherein the floor transponders listen at frequencies within a pre-determined range and generate floor responses at a single specified frequency.

20. The method of claim 14, further comprising determining a depth and an altitude of the transmitter/interrogation unit.

* * * * *